United States Patent
Julien

(10) Patent No.: US 9,759,126 B2
(45) Date of Patent: *Sep. 12, 2017

(54) COMPOUND ENGINE SYSTEM WITH ROTARY ENGINE

(71) Applicant: Pratt & Whitney Canada Corp., Longueuil (CA)

(72) Inventor: Andre Julien, Ste-Julie (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 119 days.

This patent is subject to a terminal disclaimer.

(21) Appl. No.: 14/701,809

(22) Filed: May 1, 2015

(65) Prior Publication Data

US 2015/0233286 A1    Aug. 20, 2015

Related U.S. Application Data

(63) Continuation of application No. 13/272,738, filed on Oct. 13, 2011, now Pat. No. 9,027,345.

(51) Int. Cl.
*F02G 3/00* (2006.01)
*F02B 33/44* (2006.01)
(Continued)

(52) U.S. Cl.
CPC .......... *F02B 55/14* (2013.01); *F01C 1/22* (2013.01); *F01C 11/006* (2013.01); *F01C 21/08* (2013.01); *F01C 21/18* (2013.01); *F02B 37/00* (2013.01); *F02B 55/02* (2013.01); *F01C 20/06* (2013.01); *F01C 20/10* (2013.01); *F01C 20/24* (2013.01);
(Continued)

(58) Field of Classification Search
CPC ........ F02B 53/10; F02B 37/005; F02B 37/00; F02B 2053/005; F02B 55/14; F02B 55/02; F02B 2075/125; F02B 2075/027; F02B 39/04; F01C 1/22; F01C 20/24; F01C 11/006; F01C 21/08; F01C 21/18; F01C 21/06; F01C 21/106; F01C 21/183;
(Continued)

(56) References Cited

U.S. PATENT DOCUMENTS 3,102,492 A    9/1963  Bentele et al.
3,134,337 A    5/1964  Paschke
(Continued)

FOREIGN PATENT DOCUMENTS

CN    2249826    3/1997
CN    1228506    9/1999
(Continued)

OTHER PUBLICATIONS

Yamamoto, Kenichi, Section 4.5, Effect of Rotor Recess, Rotary Engine, 1981, pp. 47 to 49, Sankaido Co., Ltd, Tokyo, Japan.
(Continued)

*Primary Examiner* — Thai Ba Trieu
(74) *Attorney, Agent, or Firm* — Norton Rose Fulbright Canada

(57) ABSTRACT

A compound engine system including a Wankel engine having a recess defined in the peripheral wall of the rotor in each of the three rotating chambers, the recess having a volume of more than 5% of the displacement volume of the chambers. The expansion in the turbine section compensates for the relatively low expansion ratio of the rotary engine.

16 Claims, 4 Drawing Sheets

(51) Int. Cl.

| | | |
|---|---|---|
| *F02B 53/10* | (2006.01) | |
| *F02B 53/08* | (2006.01) | |
| *F02B 33/00* | (2006.01) | |
| *F01C 1/02* | (2006.01) | |
| *F02B 55/14* | (2006.01) | |
| *F02B 37/00* | (2006.01) | |
| *F02B 55/02* | (2006.01) | |
| *F01C 1/22* | (2006.01) | |
| *F01C 11/00* | (2006.01) | |
| *F01C 21/08* | (2006.01) | |
| *F01C 21/18* | (2006.01) | |
| *F01C 20/06* | (2006.01) | |
| *F01C 20/10* | (2006.01) | |
| *F01C 20/24* | (2006.01) | |
| *F01C 21/06* | (2006.01) | |
| *F01C 21/10* | (2006.01) | |
| *F04C 29/00* | (2006.01) | |

(52) U.S. Cl.
CPC ............ *F01C 21/06* (2013.01); *F01C 21/106* (2013.01); *F01C 21/183* (2013.01); *F04C 29/0092* (2013.01); *F04C 2240/20* (2013.01); *F04C 2240/80* (2013.01)

(58) Field of Classification Search
CPC ...... F01C 20/06; F01C 20/10; F04C 29/0092; F04C 2240/20; F04C 2240/80; F02C 5/06
USPC .......... 60/614, 624, 598; 123/205, 208, 213, 123/559.1; 418/61.1, 61.2
See application file for complete search history.

(56) References Cited

U.S. PATENT DOCUMENTS

| | | | |
|---|---|---|---|
| 3,171,590 A | 3/1965 | Bentele et al. | |
| 3,196,847 A | 7/1965 | Kimberley et al. | |
| 3,244,154 A | 4/1966 | Löhmer | |
| 3,246,636 A | 4/1966 | Bentele | |
| 3,249,095 A | 5/1966 | Hamada | |
| 3,297,005 A | 1/1967 | Lamm | |
| 3,398,724 A | 8/1968 | Lamm et al. | |
| 3,405,695 A | 10/1968 | Jones et al. | |
| 3,584,607 A | 6/1971 | Yamamoto | |
| 3,606,602 A | 9/1971 | Hamada et al. | |
| 3,664,778 A * | 5/1972 | Nilsson ................... | F01C 1/20 418/117 |
| 3,696,796 A | 10/1972 | Gavrun | |
| 3,698,364 A | 10/1972 | Jones | |
| 3,699,929 A | 10/1972 | Bennethum | |
| 3,703,885 A | 11/1972 | Feller | |
| 3,793,996 A | 2/1974 | Scheerer | |
| 3,795,227 A | 3/1974 | Jones | |
| 3,830,599 A | 8/1974 | Poehlman | |
| 3,847,517 A | 11/1974 | Hermes et al. | |
| 3,855,972 A | 12/1974 | Roberts | |
| 3,858,557 A * | 1/1975 | Myers ..................... | F02B 53/08 123/213 |
| 3,923,012 A | 12/1975 | Jones et al. | |
| 3,929,106 A | 12/1975 | Scott | |
| 3,976,035 A | 8/1976 | Mitchell | |
| 3,990,817 A * | 11/1976 | Ruf ........................... | F01C 1/22 418/61.2 |
| 3,994,266 A | 11/1976 | Jones | |
| 4,059,370 A | 11/1977 | Gibson | |
| 4,066,044 A | 1/1978 | Jones et al. | |
| 4,169,451 A | 10/1979 | Niggemeyer | |
| 4,715,338 A | 12/1987 | Pasquan | |
| 5,168,846 A | 12/1992 | Paul et al. | |
| 5,251,595 A | 10/1993 | Wei-Min | |
| 5,692,372 A | 12/1997 | Whurr | |
| 6,951,211 B2 | 10/2005 | Bryant | |
| 7,188,602 B1 | 3/2007 | Campbell | |
| 7,500,461 B2 | 3/2009 | Baier et al. | |
| 7,753,036 B2 | 7/2010 | Lents et al. | |
| 7,775,044 B2 | 8/2010 | Julien et al. | |
| 7,942,126 B2 | 5/2011 | Zoller | |
| 8,109,252 B2 | 2/2012 | Watkins et al. | |
| 9,027,345 B2 * | 5/2015 | Julien ...................... | F01C 1/22 123/205 |
| 2008/0141972 A1 | 6/2008 | Morrison et al. | |
| 2009/0007882 A1 | 1/2009 | Lents et al. | |
| 2012/0227397 A1 | 9/2012 | Willi et al. | |
| 2013/0025567 A1 | 1/2013 | Thomassin et al. | |
| 2014/0245988 A1 | 9/2014 | Villeneuve et al. | |

FOREIGN PATENT DOCUMENTS

| | | |
|---|---|---|
| CN | 1673500 | 9/2005 |
| EP | 2011962 | 1/2009 |
| EP | 2497902 | 9/2012 |
| GB | 1543615 | 4/1979 |
| WO | 87/04494 | 7/1987 |
| WO | 20100047960 | 4/2010 |

OTHER PUBLICATIONS

NASA Contractor Report 189106, vol. 1, Stratified Charge Rotary Engine Critical Technology Enablement, vol. 1, 1992, pp. 20 to 94, C.E. Irion and R.E. Mount, Wood-Ridge, New Jersey.

* cited by examiner

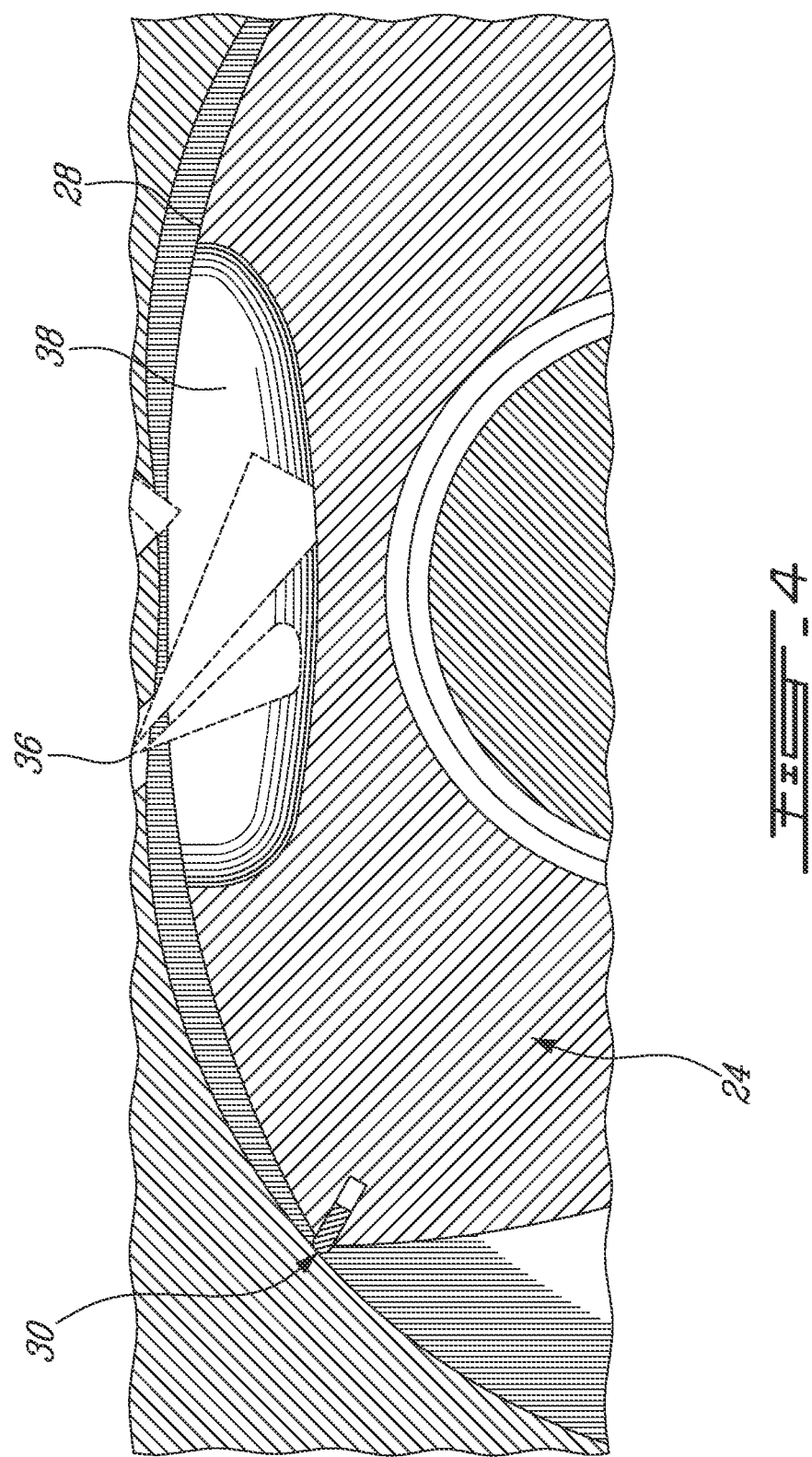

COMPOUND ENGINE SYSTEM WITH ROTARY ENGINE

CROSS-REFERENCE TO RELATED APPLICATION

This application is a continuation of U.S. application Ser. No. 13/272,738 filed Oct. 13, 2011, which claims priority on provisional U.S. application No. 61/512,570 filed Jul. 28, 2011, the entire contents of both of which are incorporated by reference herein.

TECHNICAL FIELD

The application relates generally to a compound engine system including a rotary internal combustion engine.

BACKGROUND OF THE ART

Rotary engines, such as for example Wankel engines, use the eccentric rotation of a piston to convert pressure into a rotating motion, instead of using reciprocating pistons. In these engines, the rotor includes a number of apex or seal portions which remain in contact with a peripheral wall of the rotor cavity of the engine throughout the rotational motion of the rotor to create a plurality of rotating chambers when the rotor rotates.

In a never-ending quest to achieve greater power output, Wankel engines have relatively low rotor recess volume in order to achieve the high volumetric expansion ratio required for such increased power output. However, such engines may not be fully optimized for use in turbocompounding systems, and thus room for improvement exists.

SUMMARY

In one aspect, there is provided a compound engine system comprising a rotary engine having a stator body having walls defining an internal cavity, and a rotor body mounted for eccentric revolutions within the cavity, peripheral walls of the rotor and stator bodies cooperating to provide rotating chambers of variable volume when the rotor moves relative to the stator, the volume of each chamber varying between a minimum volume and a maximum volume with a difference between the maximum and minimum volumes defining a displacement volume, the rotary engine having a volumetric compression ratio lower than a volumetric expansion ratio thereof, the peripheral wall of the rotor having a recess defined therein in each of the chambers, a volume of each recess being more than 5% of the displacement volume, the rotary engine having at least one inlet port and at least one exhaust port in successive communication with each of the chambers, a compressor section communicating with the at least one inlet port, and a turbine section connected to the at least one exhaust port.

In another aspect, there is provided a method of improving combustion stability of a compound engine system including at least one rotary engine having rotating chambers each having a volume varying between a minimum volume and a maximum volume, the method comprising positioning inlet and outlet ports of the rotary engine such that the rotary engine has a volumetric compression ratio lower than a volumetric expansion ratio thereof, and sizing a portion of each of the chambers defined in a rotor of the rotary engine such that the portion defines more than 5% of a difference between the maximum and minimum volumes.

DESCRIPTION OF THE DRAWINGS

Reference is now made to the accompanying figures in which:

FIG. 4 is a schematic, partial cross-sectional view of the rotor of FIG. 3.

DETAILED DESCRIPTION

Figure 1:
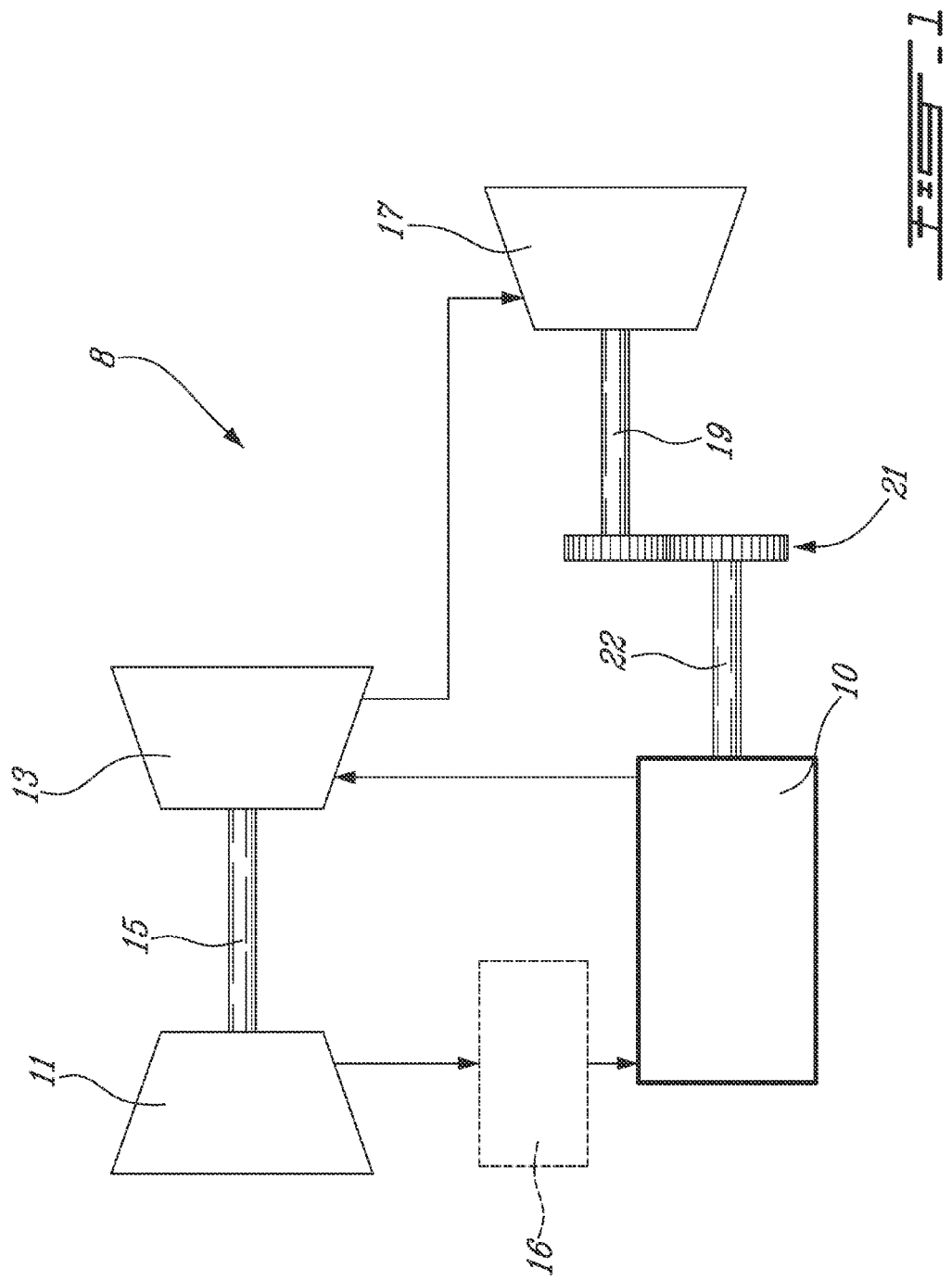
FIG. 1 is a block diagram of a compound engine system.

Referring now to FIG. 1, a compound engine system 8 is schematically shown. The system 8 includes a compressor 11 and a turbine 13 which are connected by a shaft 15, and which act as a turbocharger to one or more rotary engines 10. The compressor 11 may be a single-stage or multiple-stage centrifugal device and/or an axial device. A rotary engine 10, or a plurality of rotary engines, receives compressed air from the compressor 11. The air optionally circulates through an intercooler 16 between the compressor 11 and the rotary engine(s) 10.

The exhaust gas exiting the rotary engine 10 is supplied to the compressor turbine 13 and also to a power turbine 17, the turbines 13, 17 being shown here in series, i.e. with the exhaust gas flowing first through one of the two turbines where the pressure is reduced, and then through the other turbine, where the pressure is further reduced. In an alternate embodiment (not shown), the turbines 13, 17 are arranged in parallel, i.e. with the exhaust gas being split and supplied to each turbine at same pressure. In another alternate embodiment, only one turbine is provided.

Energy is extracted from the exhaust gas by the compressor turbine 13 to drive the compressor 11 via the connecting shaft 15, and by the power turbine 17 to drive an output shaft 19. The output shaft 19 may be connected via a gear system 21 to a shaft 22 connected to the rotary engine(s) 10. The combined output on the shafts 19, 22 may be used to provide propulsive power to a vehicle application into which the system 8 is integrated. This power may be delivered through a gearbox (not shown) that conditions the output speed of the shafts 19, 22 to the desired speed on the application. In an alternate embodiment, the two shafts 19, 22 may be used independently to drive separate elements, e.g. a propeller, a helicopter rotor, a load compressor or an electric generator depending whether the system is a turboprop, a turboshaft or an APU (Auxiliary Power Unit).

Although not shown, the system 8 also includes a cooling system, including a circulation system for a coolant to cool the outer body of the rotary engine (e.g. water-ethylene, oil, air), an oil coolant for the internal mechanical parts of the rotary engine, one or more coolant heat exchangers, etc.

The compound engine system 8 may be as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein.

Figure 2:
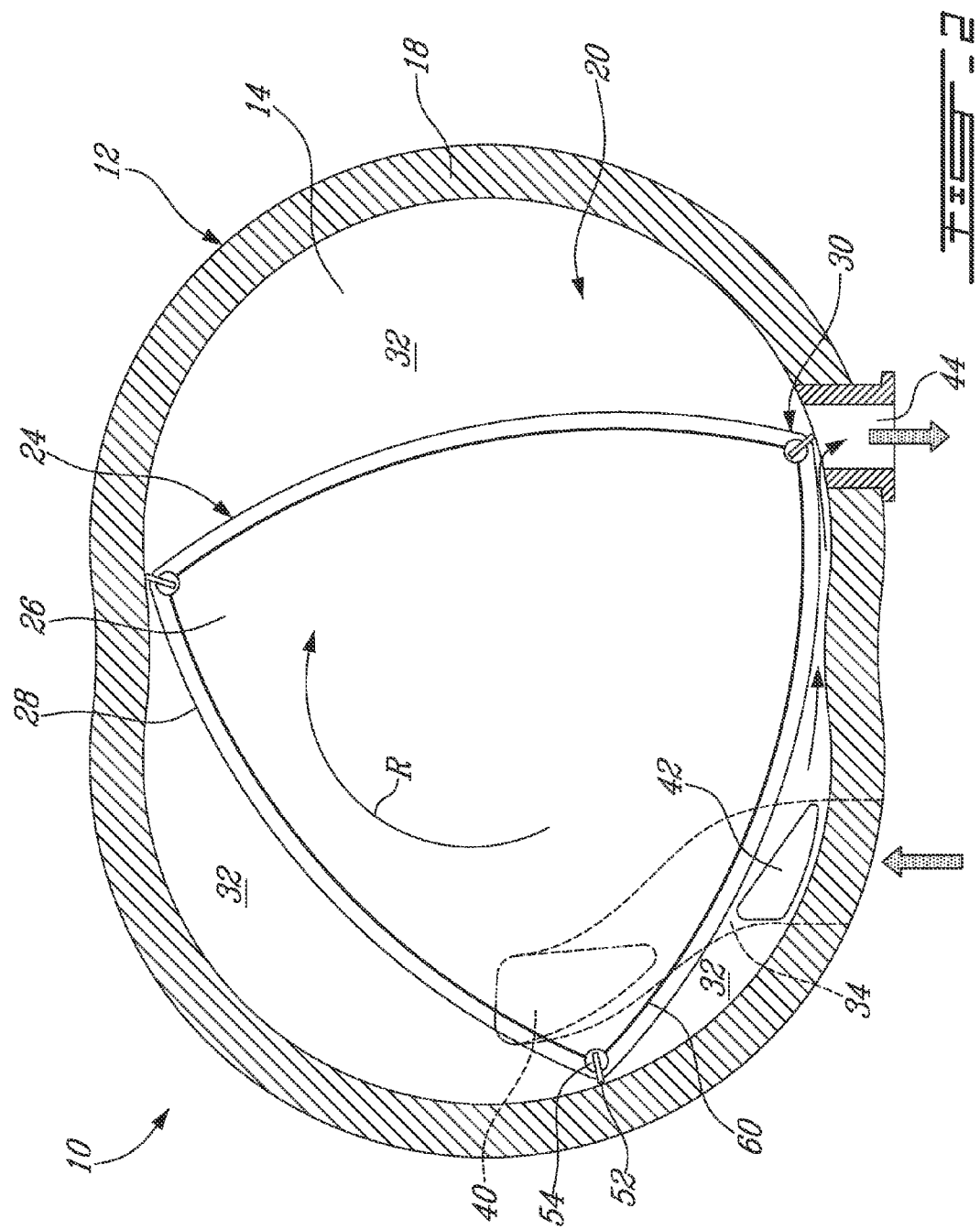
FIG. 2 is a schematic cross-sectional view of a rotary internal combustion engine which can be used in a system such as shown in FIG. 1.

The rotary engine 10 forms the core of the compound cycle engine system 8. Referring to FIG. 2, an embodiment of the rotary engine 10, known as a Wankel engine, is schematically shown. The rotary engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides. The apex portions 30 are in sealing engagement with the inner surface of peripheral wall 18 to form three rotating working chambers 32 between the inner rotor 24 and outer body 12. The geometrical axis of the rotor 24 is offset from and parallel to the axis of the outer body 12.

The working chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown in the Figures, the rotor 24 is journaled on an eccentric portion of a shaft and includes a phasing gear co-axial with the rotor axis, which is meshed with a fixed stator phasing gear secured to the outer body co-axially with the shaft. The shaft rotates the rotor 24 and the meshed gears guide the rotor 24 to perform orbital revolutions within the stator cavity. The rotor 24 performs three rotations for each orbital revolution. Oil seals are provided around the phasing gear to impede leakage flow of lubricating oil radially outwardly thereof between the respective rotor end face 26 and outer body end wall 14.

During one orbital revolution, each chamber varies in volumes and moves around the stator cavity to undergo the four phases of intake, compression, expansion and exhaust, these phases being similar to the strokes in a reciprocating-type internal combustion engine having a four-stroke cycle.

The engine includes a primary inlet port 40, shown here as being defined in the end wall 14; in an alternate embodiment, the primary inlet port 40 may be defined through the peripheral wall 18. The primary inlet port 40 is in communication with the exhaust of the compressor 11 through an intake duct 34 which is defined as a channel in the end wall 14. The primary inlet port 40 delivers air to each of the chambers 32, and a fuel injection port 36 (see FIG. 4) is also provided for delivering fuel into each chamber 32 after the air therein has been compressed. Fuel, such as kerosene (jet fuel) or other suitable fuel, is delivered into the chamber 32 such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug).

The engine also includes an exhaust port 44, shown here as being defined through the peripheral wall 18; in an alternate embodiment, the exhaust port 44 may be defined through the end wall 14. The exhaust port 44 communicates with the inlet of at least one of the turbines 13, 17.

The rotary engine 10 operates under the principle of the Miller or Atkinson cycle, with its compression ratio lower than its expansion ratio. For example, the ratio obtained by dividing the volumetric compression ratio by the volumetric expansion ratio may be between 0.3 and 0.8, and more particularly about 0.4-0.5. Accordingly, the primary inlet port 40 is located further away (i.e. measured as a function of piston rotation) from the exhaust port 44 when compared to a rotary engine having compression and expansion ratios that are equal or approximately equal to one another. The angle of the primary inlet port 40, relative to the angle of the exhaust port 44, can then be determined to achieve a desired peak cycle pressure given the inlet air pressure. The position of the primary inlet port 40 may vary between the 7 o'clock position up to the 10 o'clock position. In the embodiment shown, the primary inlet port 40 extends between the 8 o'clock and the 9 o'clock positions.

In the embodiment shown, the primary inlet port 40 is spaced from the exhaust port 44 so that the rotor 24 prevents communication therebetween in all rotor positions. In an alternate embodiment, the primary inlet port 40 and exhaust port 44 may be in momentary communication with each other throughout the revolution of the rotor 24.

The rotary engine 10 may also include a secondary inlet port or purge port 42 also in communication with the exhaust of the compressor 11. The purge port 42 is shown here as being defined through the end wall 14 and communicating with the same intake duct 34 as the primary inlet port 40; alternately, the purge port 42 may be defined through the peripheral wall 18, and/or be defined independently of the primary inlet port 40. The purge port 42 is located rearwardly of the primary inlet port 40 and forwardly of the exhaust port 44 along the direction R of the rotor revolution and rotation. The purge port 42 is located such as to be in communication with the exhaust port 44 through each of the chambers 32 along a respective portion of each revolution, to effectively purge each of the chambers 32. In an alternate embodiment, the purge port 42 may be omitted, particularly but not exclusively when the inlet port 40 and exhaust port 44 are in momentary communication with each other.

Figure 3:
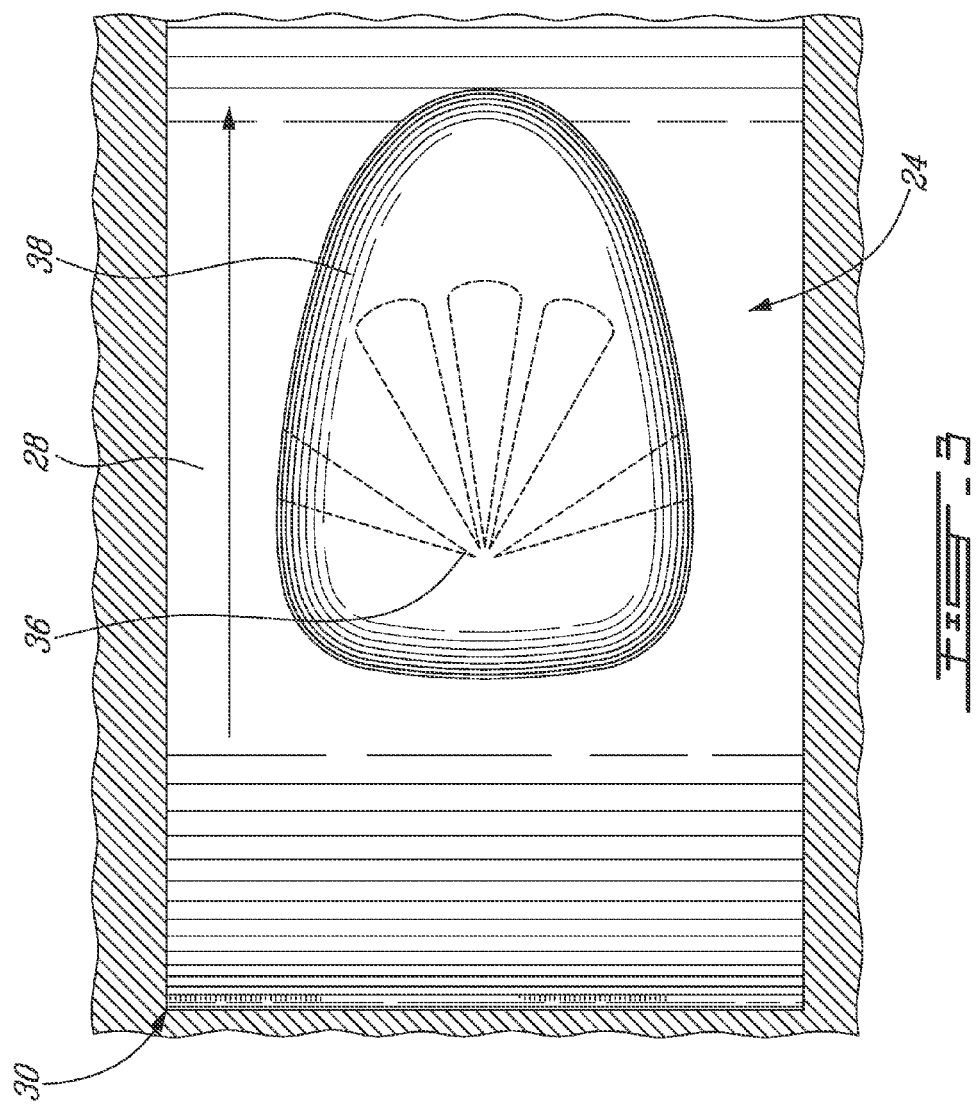
FIG. 3 is a schematic, partial peripheral view of a rotor of the engine of FIG. 2.

Referring to FIGS. 3-4, the peripheral face 28 of the rotor 24 includes a recess 38 defined therein between each pair of adjacent apex portions 30. The recess 38 defines part of the volume of the corresponding chamber 32; when the chamber 32 is at its minimum volume, for example at Top Dead Center, the recess 38 defines a significant part of the volume of the chamber 32.

Typical Wankel engines have relatively low rotor recess volume in order to have a high volumetric expansion ratio for a generally higher power output. However, a low recess volume limits the combustion volume which in turn may limit the amount of fuel burned, the rotational speed and the quality of combustion, especially for Wankel engines used with heavy fuel. It has been discovered that it is possible to increase the volume of the recess 38 above the usual volume seen in typical Wankel engines while having an acceptable power output of the system 8. In a particular embodiment, the volume of each recess 38 corresponds to between 5% and 15% of the displacement volume of the corresponding chamber 32 of the rotor 24, with the displacement volume being defined as the difference between the maximum and minimum volume of one chamber 32. In another particular embodiment, the volume of each recess 38 is at least 6% and at most 11% of the displacement volume. In a further particular embodiment, the volume of each recess 38 corresponds to about 8 to 10% of the displacement volume.

The recess 38 may be defined as a single, dual or multiple pocket(s) in the peripheral face, which together define the recess volume. The shape of the recess 38 may be different than that of the particular embodiment shown.

The increased volume of the recess 38 allows for a reduced volumetric compression ratio, which may improve combustion stability and efficiency. A higher combustion volume when the rotor 24 comes near Top Dead Center may allow the rotary engine 10 to burn more fuel as more air is available, and as such turn the rotary engine faster and increase the power density. The increased ratio of volume to wall surface may also reduce heat losses which tend to quench the flame. The increased combustion chamber volume may also allow flexibility in injection spray design.

However, the increased volume of the recess 38 correspondingly lowers the expansion ratio and as such would tend to lower the power output of the rotary engine when used alone. However, in the compound system 8, the lower expansion ratio of the rotary engine 10 is compensated by the expansion within the turbines 13, 17.

In a particular embodiment, the expansion ratio of the turbines 13, 17 is selected such that the turbine section provides a power output corresponding to from 20% to 35% of the total power output of the compound engine system 8. In a particular embodiment, this may be achieved by having an expansion ratio in the turbine section which is similar to the boost compression pressure ratio, i.e. the compression pressure ratio of the compressor 11.

The increased power output of the turbine section may provide increased power for a given air mass flow, which may result in a smaller, lighter and more efficient engine at a given power. The low volumetric compression ratio of the rotary engine 10 may help heavy fuel (e.g. diesel, kerosene (jet fuel), equivalent biofuel) to remain at a pressure low enough to prevent self-ignition which may help ensure that the cycles runs with direct injection with a source of ignition, may save structural weight, and may reduce internal leakages.

Although the rotary engine 10 with the increased volume recess may assist in permitting for the large volume and improved combustion in non-intercooled systems such as described in U.S. Pat. No. 7,775,044, it may also be employed in other suitable systems, such as shown in U.S. Pat. No. 7,753,036 with or without intercooling, assuming suitable expansion ratios are selected. With intercooled systems, use of the larger recess volume may indeed facilitate stable combustion and hence improve such intercooled systems.

The above description is meant to be exemplary only, and one skilled in the art will recognize that changes may be made to the embodiments described without departing from the scope of the invention(s) disclosed. For example, the present teachings may be applied to any suitable rotary engine, such as a rotary vane pumping machine or other suitable engine, and is thus not limited in application to Wankel engines. Other modifications which fall within the scope of the present invention will be apparent to those skilled in the art, in light of a review of this disclosure, and such modifications are intended to fall within the appended claims.

The invention claimed is:

1. A compound engine system comprising:
a Wankel engine having a rotor body mounted for eccentric revolutions within an internal cavity of a stator body to provide three rotating chambers of variable volume in the internal cavity, the internal cavity having an epitrochoid shape with two lobes, the rotor body having three apex portions separating the three rotating chambers, the volume of each of the three rotating chambers varying between a minimum volume and a maximum volume with a difference between the maximum and minimum volumes defining a displacement volume, a peripheral wall of the rotor body having a recess defined therein in each of the three rotating chambers, a volume of each recess being more than 5% of the displacement volume;
a compressor communicating with at least one inlet port of the Wankel engine for successive communication with each of the three rotating chambers; and
a turbine connected to at least one exhaust port of the Wankel engine for successive communication with each of the three rotating chambers.

2. The system as defined in claim 1, wherein a volumetric compression ratio of the Wankel engine is lower than a volumetric expansion ratio of the Wankel engine.

3. The system as defined in claim 1, wherein the volume of each recess is at least 6% of the displacement volume.

4. The system as defined in claim 2, wherein the volume of each recess is at least 6% of the displacement volume.

5. The system as defined in claim 2, wherein the volume of each recess is at most 15% of the displacement volume.

6. The system as defined in claim 2, wherein the volume of each recess is at most 11% of the displacement volume.

7. The system as defined in claim 2, wherein the volume of each recess is about 8% of the displacement volume.

8. The system as defined in claim 2, wherein the volume of each recess is about 10% of the displacement volume.

9. The system as defined in claim 2, wherein the volume of each recess is about 8 to 10% of the displacement volume.

10. The system as defined in claim 2, wherein each recess is defined by a single pocket formed in the peripheral wall.

11. The system as defined in claim 1, wherein the volume of each recess is at most 15% of the displacement volume.

12. The system as defined in claim 1, wherein the volume of each recess is at most 11% of the displacement volume.

13. The system as defined in claim 1, wherein the volume of each recess is about 8% of the displacement volume.

14. The system as defined in claim 1, wherein the volume of each recess is about 10% of the displacement volume.

15. The system as defined in claim 1, wherein the volume of each recess is about 8 to 10% of the displacement volume.

16. The system as defined in claim 1, wherein each recess is defined by a single pocket formed in the peripheral wall.

* * * * *